D. D. SMITH.
INSECT DESTROYER.
APPLICATION FILED DEC. 19, 1918.
1,302,095.
Patented Apr. 29, 1919.
2 SHEETS—SHEET 1.
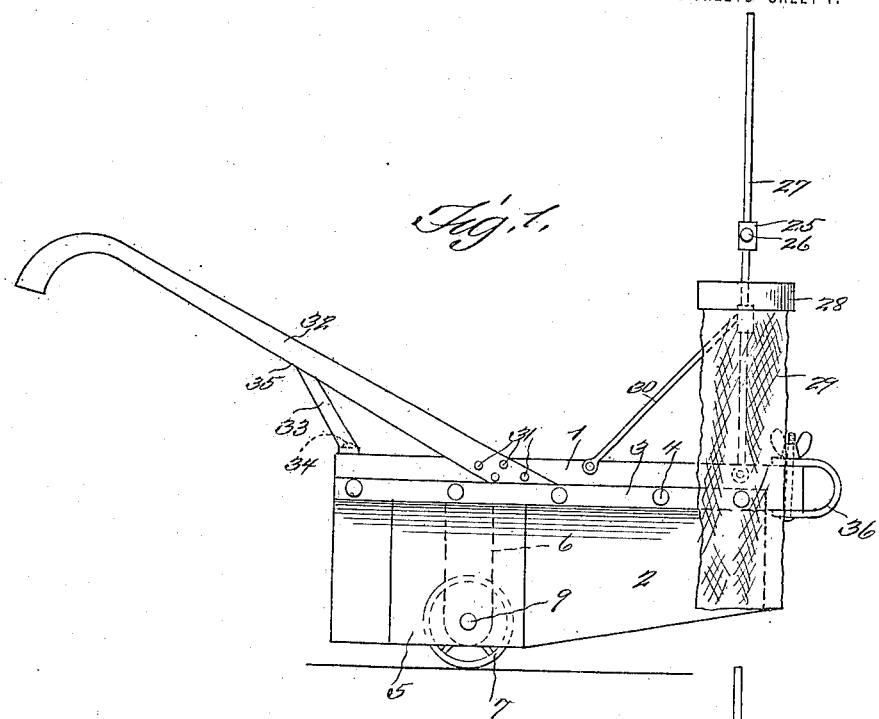
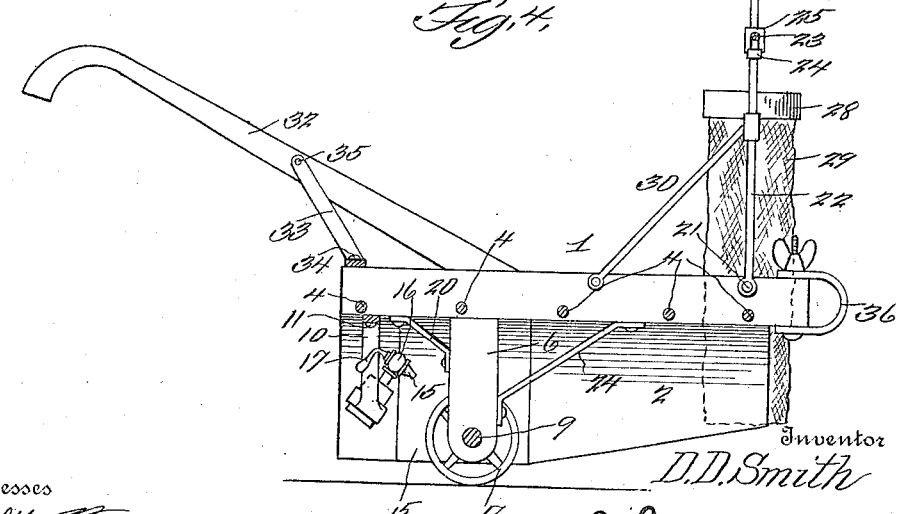
Witnesses
Philip Terrell
Frances G. Powell
Inventor
D. D. Smith
By
D. Swift & Co.
his Attorneys

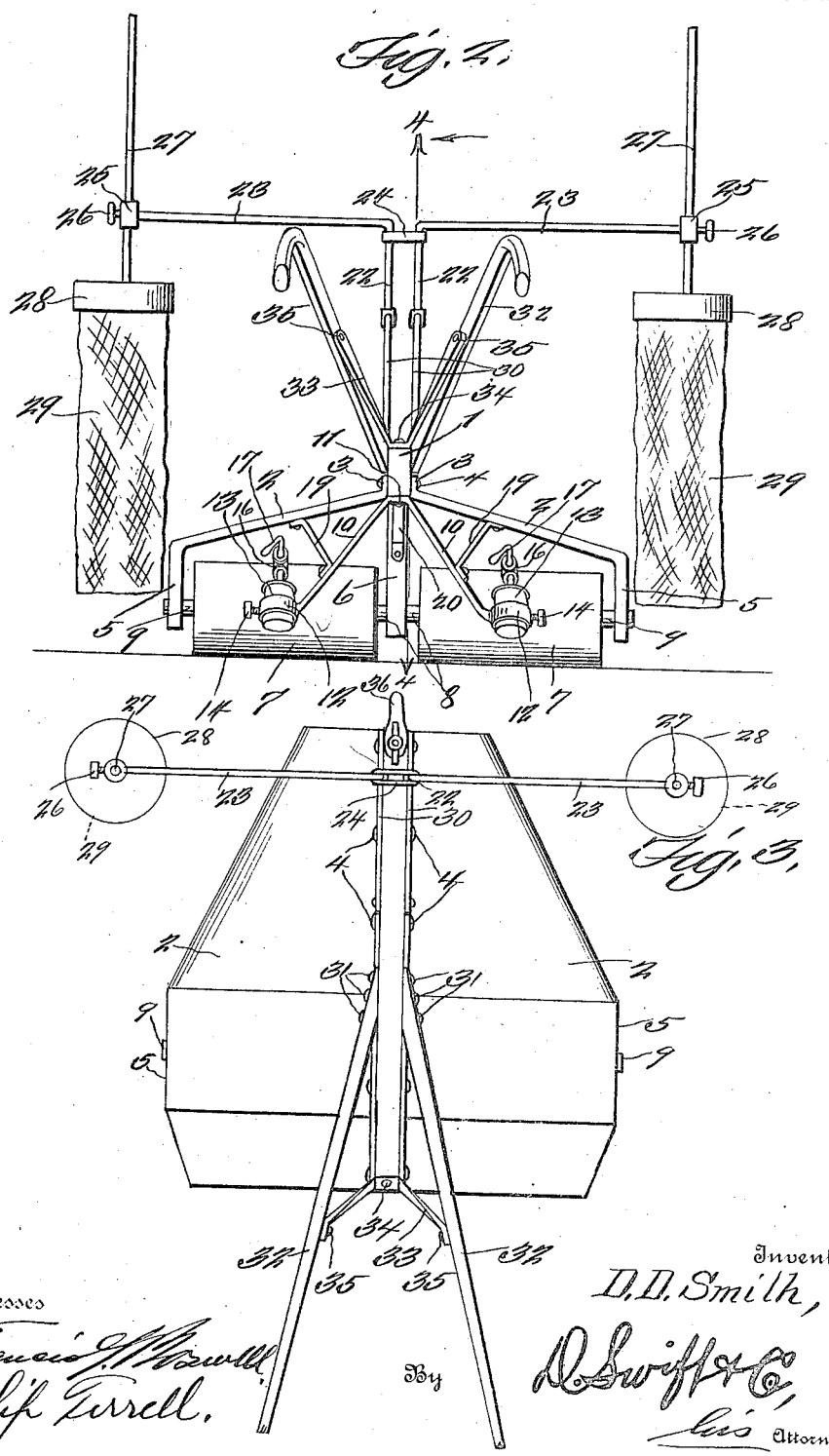

UNITED STATES PATENT OFFICE.

DANIEL D. SMITH, OF VALDOSTA, GEORGIA.

INSECT-DESTROYER.

1,302,095.  Specification of Letters Patent.  Patented Apr. 29, 1919.

Application filed December 19, 1918. Serial No. 267,441.

*To all whom it may concern:*

Be it known that I, DANIEL D. SMITH, a citizen of the United States, residing at Valdosta, in the county of Lowndes, State of Georgia, have invented a new and useful Insect-Destroyer; and I do hereby declare the following to be a full, clear, and exact description of the invention, such as will enable others skilled in the art to which it appertains to make and use the same.

This invention relates to an improved insect destroyer, and one of the objects of the invention is to provide a simple, efficient and practical device of this kind for destroying or exterminating insects, very often prevalent around various crops, particularly such insects as boll weevils.

In the growing of cotton the young fruit becomes stung by the insect or weevil, and when the fruit falls on the ground, the egg hatches a grub or small worm, which subsequently becomes converted into a weevil. The fallen young fruit in the cotton growing districts is very often commonly termed "squares". Therefore, a further object of the invention is to provide an insect destroyer having revoluble members, which are subjected to intense heat while traveling over the soil between the rows of crop, in order to roll over the fallen fruit or squares so as to kill or destroy the eggs (which have been deposited on the fruit when stung by the weevil) by the heat from the members or rollers.

A further object of the invention is to provide insecticide or insect fluid or powder containers, constructed of suitable cloth or bagging or other material mounted upon the forward end of the machine. These containers may be saturated with the insecticide fluid, or contain the powder, and adapted to drag over the plants in front of the heated rollers or revoluble members for driving the weevil from the punctured fruit or squares to the ground, whereby the heated rollers or revoluble members may pass thereover, thereby scalding the grubs or weevils to death.

A further object of the invention is to provide means whereby said containers are adjustably supported.

A further object of the invention is to provide yieldable means for supporting the containers, so that the containers may vibrate, whereby the powder or fluid may be thoroughly distributed for driving or smoking the punctured fruit or squares.

A further object of the invention is to provide a hood for confining the heat adjacent the ground and to protect the fruit and plants from coming in contact with the heated rollers or revoluble members, as well as preventing the wind from affecting the flames from the blow lamps.

In practical fields the details of construction may necessitate alterations falling within the scope of what is claimed.

The invention comprises further features and combinations of parts as hereinafter set forth shown in the drawings and claimed.

In the drawings:—

Figure 1 is a view in side elevation of the improved insect destroyer constructed in accordance with the invention. Fig. 2 is a rear view of the same.

Fig. 3 is a plan view of the destroyer.

Fig. 4 is a sectional view on line 4—4 of Fig. 2.

Referring more especially to the drawings 1 designates an elongated beam, and 2 denotes a pair of shields, which extend laterally and downwardly from and have their flanges 3 secured at 4 to the opposite faces of the beam 1. These shields so arranged form a hood, as well as a frame, and their outer portions have downwardly extending flanges 5. Depending from the beam 1 is a bearing post 6, and 7 denotes a pair of rollers, constructed of any suitable material preferably metal. These rollers have their pintles 8 and 9 journaled in bearings in the depending post 6 and the flanges 5 respectively, so that when the frame is in motion the roller may traverse the soil in between the rows or plants. A V-shaped bracket 10 is secured at 11 to the under edge of the beam 1, and the lower ends of the arms of said bracket terminate in annular rings or bands 12, in which the blow lamps 13 are secured adjustably by the thumb screws 14. These lamps have blow torches 15, the valves 16 of which are actuated by the handles 17, so as to control the fuel (which is ignited at the outlet of the torches) as well as the flame, which is directed toward and upon the cylindrical surfaces of the revoluble rollers or members. These intensely heated rollers are designed to roll over the fallen squares or fruit of the cotton plant, which has been stung by the weevil and an egg deposited, so as to burn or scald the grub or weevil to death. The arms of the V-shaped bracket are reinforced by the braces 19, while the depending post 6 is reinforced by the braces 20. Rising upwardly from and secured to the beam 1 as at 21, are spring rods or members 22, which have laterally extending portions 23. The perpendicular parts of the rods 22 are held in parallelism and braced by the loop 24, which is arranged adjacent the lateral portions 23. The outer ends of the lateral portions (which will vibrate incident to the vibrating of the frame) terminate in sleeves 25 provided with set screws 26. Rods 27 are held adjustably in the sleeve 25 by said set screws. The lower ends of the rods 27 carry suitable bands 28, which in turn support the fabric containers 29. These containers may be constructed of any suitable fabric preferably cloth or bagging, and may contain a suitable insect powder, or may be saturated with suitable insecticide fluid, and adapted to pass over the top of the plants in advance of the rollers, for driving grubs or weevils out of the plants to the ground, whereby they may be burned or scalded by the heated rollers. The perpendicular parts of the rods 22 are reinforced by the braces 30. It is obvious that the containers may be adjusted in different positions vertically over the plants. Rising upwardly and extending rearwardly and secured at 31 are handles 32, which are reinforced by the V-shaped brace 33, the crotch portion of which is secured at 34 to the beam 1, while the ends of the arms thereof are secured at 35 to the handles. The forward end of beam 1 has a conventional form of clevis 36, to which an evener or equalizer of the draft animals may be connected, whereby the destroyer may be drawn over the soil. The hood is designed for the purpose of confining the heat to the ground, and preventing the heat from scorching the plants, at the same time guarding the flames from the torches.

The invention having been set forth what is claimed as new and useful is:—

1. In an insect destroyer, the combination with a frame, of heat generating means below and carried in the frame and adapted to traverse the soil between the rows of plants, insecticide containers supported over the rows of plants, vibrating supports on the frame, and adjustable connections between the containers and the supports.

2. In an insect destroyer, the combination with a frame, of means under the frame for subjecting intense heat toward and for burning or scalding the weevils of the fallen fruit from the plants, and adjustable vibrating insecticide containers supported on the frame over the rows of plants.

3. In an insect destroyer, the combination with a frame having means for burning or scalding weevils of the fallen fruit from the plants, of supports rising upwardly from and connected to the frame and provided with vibrating parts, insecticide containers to traverse over the tops of the plants and adjustably supported on said vibrating parts.

4. In an insect destroyer, the combination with a frame having a hood extending outwardly from either side, heated rollers journaled in the frame and the hood and adapted to traverse the soil between the rows of plants, for burning or scalding the weevils of the fallen fruit from the plants, and vibrating insecticide means supported on the frame for dragging over the tops of the plants for driving or smoking out the weevils.

5. In an insect destroyer, the combination with a frame having shields, one extending from each side of the frame, thereby forming a hood, of rollers journaled in bearings of the frame and the hood, means for subjecting heat to the rollers, thereby generating sufficient heat for burning or scalding weevils of the fallen fruit from the plants, supports on the frame having laterally extending vibrating portions, insecticide containers constructed of cloth fabric to traverse the tops of the plants, said containers having perpendicular rods, and means for adjustably connecting the perpendicular rods to the lateral vibrating portions, whereby the containers may vibrate.

In testimony whereof I have signed my name to this specification in the presence of two subscribing witnesses.

DANIEL D. SMITH.

Witnesses:
H. Y. TILLMAN,
D. FERGUSEN.

Copies of this patent may be obtained for five cents each, by addressing the "Commissioner of Patents, Washington, D. C."